US006758295B2

(12) United States Patent
Fleming

(10) Patent No.: US 6,758,295 B2
(45) Date of Patent: Jul. 6, 2004

(54) TURBINE GENERATOR REGENERATIVE BRAKING SYSTEM

(76) Inventor: Patrick Fleming, 1355 Washam, Eagle, ID (US) 83616

(*) Notice: Subject to any disclaimer, the term of this patent is extended or adjusted under 35 U.S.C. 154(b) by 31 days.

(21) Appl. No.: 10/119,531

(22) Filed: Apr. 8, 2002

(65) Prior Publication Data

US 2003/0188904 A1 Oct. 9, 2003

(51) Int. Cl.[7] .................................................. B60K 1/00
(52) U.S. Cl. ...................... 180/165; 180/65.3; 303/152; 60/414
(58) Field of Search .......................... 180/165, 2.1, 2.2, 180/65.1, 65.3, 65.2; 60/413, 414, 330, 333, 668, 698, 417; 303/10, 152

(56) References Cited

U.S. PATENT DOCUMENTS

| | | | | |
|---|---|---|---|---|
| 3,665,788 A | * | 5/1972 | Nyman | 475/72 |
| 4,098,144 A | | 7/1978 | Besel et al. | 74/687 |
| 4,114,734 A | | 9/1978 | Bultmann | 188/274 |
| 4,270,806 A | * | 6/1981 | Venkaperumal et al. | 303/3 |
| 4,282,948 A | * | 8/1981 | Jerome | 180/165 |
| 4,342,371 A | | 8/1982 | Smitley | 180/165 |
| 4,413,698 A | * | 11/1983 | Conrad et al. | 180/305 |
| 4,414,805 A | | 11/1983 | Walker | 60/39.161 |
| 4,479,356 A | | 10/1984 | Gill | 60/699 |
| 4,592,454 A | * | 6/1986 | Michel | 192/3.23 |
| 4,753,078 A | * | 6/1988 | Gardner, Jr. | 60/668 |
| 4,760,697 A | * | 8/1988 | Heggie et al. | 60/408 |
| 4,798,053 A | | 1/1989 | Chang | 60/712 |
| 5,400,596 A | | 3/1995 | Shlien | 60/597 |
| 5,505,527 A | | 4/1996 | Gray, Jr. et al. | 303/3 |
| 5,923,093 A | | 7/1999 | Tabata et al. | 290/40 C |
| 5,931,249 A | | 8/1999 | Ellis et al. | 180/165 |
| 5,971,092 A | * | 10/1999 | Walker | 180/308 |
| 6,068,351 A | | 5/2000 | Martin-Gerez | 303/10 |
| 6,170,587 B1 | | 1/2001 | Bullock | 180/69.6 |
| 6,332,257 B1 | | 12/2001 | Reed, Jr. et al. | 29/401.1 |

* cited by examiner

Primary Examiner—Brian L. Johnson
Assistant Examiner—Brian L Swenson
(74) Attorney, Agent, or Firm—Pedersen & Co., PLLC; Ken J. Pedersen; Barbara S. Pedersen

(57) ABSTRACT

A turbine generator regenerative braking system for an automotive or other vehicle having ground engaging wheels and an electrical energy storage device. The braking system comprises an hydraulic fluid turbine generator having an electrical power output connected to the electrical energy storage device, a plurality of hydraulic fluid pumps, an actuation system for operatively connecting/starting pumping action, and a hydraulic fluid circuit connecting the hydraulic pumps to the turbine generator. In some versions of the system, a hydraulic pump, a clutch and an adjustable flow nozzle will be dedicated to each ground engaging wheel of the vehicle. In operation, braking is preferably initiated by the actuation of a brake master cylinder which provides hydraulic pressure to cause each rotating wheel with its corresponding hydraulic pump to engage. The pressurized fluid output of each pump is then fed to the turbine through the adjustable-flow nozzle causing the flywheel, and thus the generator, to rotate. The rotation of the turbine generator produces electrical power which is transmitted to the vehicle's electrical energy storage device.

8 Claims, 5 Drawing Sheets

TURBINE GENERATOR REGENERATIVE BRAKING SYSTEM

BACKGROUND OF THE INVENTION

1. Field of the Invention

This invention relates, in general, to braking systems and, more particularly, to regenerative braking systems for vehicles. This invention relates to a regenerative braking system that slows a vehicle by operatively connecting a hydraulic pump system to the vehicle's rotating wheels to pump fluid to a turbine for electric generation.

2. Related Art

The prior art is replete with approaches to extracting, storing and beneficially using the energy usually dissipated during vehicle braking. These approaches in part include many combinations and interconnections of flywheels, hydraulic and pneumatic accumulators, motors, pumps, and the like. None of the known prior art, however, incorporates a turbine generator for regenerative braking and electrical energy generation, as in the present invention. The following brief review of some of the prior art will be useful in establishing the novelty and utility of the present invention.

Bultmann (U.S. Pat. No. 4,114,734) has disclosed a braking system having a hydrodynamic coupling driven by the vehicle, wherein the operating fluid is conducted into an external circulatory system by way of a cooler or radiator. This hydrodynamic coupling also serves as a feed pump for the operating fluid and is operatively connected with a turbine to drive a separate cooling fan. In this manner, heat removal from the braking system may be facilitated.

Smitley (U.S. Pat. No. 4,342,371) also teaches a flywheel approach to storing and supplying energy for vehicles. The flywheel is selectively connected to the power train of a vehicle and absorbs energy from the vehicle's ground engaging wheels during the deceleration of the vehicle. This process provides at least a degree of vehicular braking. A clutch is also provided to selectively engage/disengage the flywheel connection to the wheels.

Chang (U.S. Pat. No. 4,798,053) employs a vehicle's engine to compress air when the vehicle decelerates and reuses the air thus-compressed to drive an air motor which assists in moving the vehicle when it is underway again.

Gray et al. (U.S. Pat. No. 5,505,527) provides a vehicular powertrain with regenerative braking having a pump/motor combination connected to the vehicle's drive wheels. In the vehicle's braking mode, the pump comes into play and charges an accumulator. When it is desired to accelerate the vehicle, the accumulator releases its stored energy by providing hydraulic power to the motor which, in turn, drives the vehicle's wheels. Controls and switches are provided to implement and coordinate the various functions of the components.

Ellis et al. (U.S. Pat. No. 5,931,249) disclose a kinetic energy storage system that uses a flywheel with a motor generator to store energy. The flywheel rotates at a high speed in a vacuum. The flywheel may also be used to power the vehicle.

Martin-Gerez (U.S. Pat. No. 6,068,351) teaches an axle-driven pumping mechanism used to pressurize a volume of hydraulic fluid in response to a braking command. The fluid thus-pressurized activates a turbine that is used to drive a cooling fan directed at a radiator used to dissipate heat in the hydraulic fluid.

As can readily seen from the above review, the prior art is silent with respect to extracting energy to affect vehicular braking by hydraulically turning a turbine generator with a fluid-jet powered by the rotation of the wheels. No prior art approach is known to anticipate the present invention's innovative incorporation of a turbine generator actuated by fluid-jet energy recovered during the braking phase of a vehicle's operation. The extraction of energy by the fluid-jet-powered turbine generator aids in braking the vehicle and the electrical energy the turbine generates is stored in the vehicle's electrical storage system, typically batteries. However, other electrical storage systems may also be used like, for example, ultra-capacitors (see "electriccomponents.com").

Thus it is a primary objective of this invention to provide a braking system that generates electrical energy while facilitating braking of the vehicle. It is another object of this invention to include a turbine generator in such a system that is powered by a fluid-jet driven by the vehicle's wheels. It is a further object of this invention to store the generated electrical energy for the later use by the vehicle. It is yet another object of this invention to provide such a system that is robust and inexpensive to manufacture, install and operate. Another object of this invention is to provide a turbine generator regenerative braking system that is applicable to any apparatus requiring braking independent of the primary motive power.

SUMMARY OF THE INVENTION

This invention is a turbine generator regenerative braking system for a vehicle having ground-engaging wheels and an electrical energy storage device. The braking system comprises an hydraulic fluid turbine generator having an electrical power output connected to the electrical energy storage device, one or more hydraulic fluid pumps, and an hydraulic fluid circuit operatively and cooperatively connecting the hydraulic pump(s) to the turbine generator. Further, the braking system comprises an actuator system adapted to operatively connect the fluid pump(s) to the wheel(s) and to actuate the pump operation, powered by the wheel(s), for pumping fluid through the hydraulic fluid circuit. An operator's foot pedal or other operator control means is adapted to signal the actuator system, preferably controlling application of the brakes in an incremental manner. Preferably, the hydraulic fluid circuit comprises outlet nozzles through which the hydraulic fluid is forced to jet against cups/blades of the turbine, for generation of electricity.

By slowing the vehicle, via a method that comprises operative connection of the wheels to fluid pumps that power a turbine, the invented system transfers some of the vehicle kinetic energy into electrical energy rather than dissipating the energy as heat during conventional frictional slowing by brake shoes. The system preferably has adjustment features for controlling/varying the amount of braking, so that the braking system may be used during travel for slowing or for slowing and stopping. Adjustment features preferably comprise the jet nozzles being adjustable to vary flow restriction in the hydraulic line(s). Further, another adjustment feature may comprise a variable pump rate such as with a variable positive-displacement pump. The preferred fluid turbine generator comprises a flywheel, a plurality of cup blades on the flywheel like a Pelton wheel, and an electrical generator section. The flywheel may have fan-like blades or other structure on which the fluid jets impinge. Optionally, power-take-off (PTO) may be provided mechanically from the flywheel shaft.

In most embodiments of this invention, each wheel may power, and, hence, may be slowed by, the fluid-jet-turbine system. Each wheel may be operatively connected/connectable to its own respective fluid hydraulic pump and its own respective fluid line-and nozzle, so that a pump and nozzle system is connected to and dedicated to each of the plurality of wheels.

The actuation system comprises a mechanism for starting and stopping pump operation in response to whether and how much the operator is applying the brakes. The actuation system comprises operative connection of the rotating wheel(s) to the pump(s), which may be accomplished in various ways comprising mechanical connection/coupling of a pump that automatically pumps when connected, start-up of the pump separate from mechanical connection, or start-up or speeding-up of a pump that is already connected to the wheel. For example, the pump device may be mechanically engaged with the wheel at all times, but with the pump adapted to not pump fluid until braking is actuated by the operator. Such a system, for example, could comprise a variable-positive-displacement pump that is adapted to be at a zero pumping rate during normal non-braking operation but that increase to a non-zero pumping rate when the brake is actuated. In such a case, actuation of the pump would not necessarily affect physical connection of the pump to the wheel by a clutch, but actuation would comprise startup of the already-connected pump and/or increasing of the pumping rate to the desired level. Alternatively, the pump may be disengaged mechanically from the wheel until braking is actuated, at which time a clutch or other coupling mechanism mechanically connects the pump to the wheel and actuates pumping of fluid.

The actuation system may comprise various types of actuation, for example, mechanical, hydraulic, air, electrical switching, or other mechanism for causing/allowing the engagement/coupling of the pump to the wheel and/or starting up or increasing the speed or displacement volume of the pump. The actuation is controlled by the operator of the vehicle, and preferred mechanism is a hydraulic master cylinder powered by the driver pressing on a foot pedal in the vehicle cab, and conduits conveying hydraulic fluid to (and hence operating) the preferred clutch system, pump start-up system, or variable rate/displacement mechanism adjustment system. After actuation, the pump is fed by a hydraulic reservoir and powered by the vehicle wheel(s) to force fluid flow through the hydraulic line downstream of each pump to its corresponding adjustable-flow nozzle for delivering/spraying hydraulic fluid against the turbine's blades/cups. The fluid flow from each nozzle impinges on the preferred cup blades, causing the turbine flywheel to rotate, and thus the generator, to rotate. The rotation of the turbine generator thus generates electrical power which is transmitted to the vehicle's electrical energy storage device.

In effect, therefore, this extraction of power from the wheels, to pump fluid through the conduits and through the nozzles, initiates the braking action on each of the wheels. Further braking action may be achieved by a closing movement of needle valves within the nozzles, which provides an increased restriction to fluid flow. This closing movement is preferably controlled by the operator's action in the vehicle cab, that is, preferably pushing harder on the brake pedal. The fluid dynamics affected by closing of the nozzles may include increased pressure/head in the output circuit of each pump, reduced fluid flow rate, reduced pump speed, via this additional work load on the pump and, therefore, on the wheel(s).

The nozzle(s) may be adapted to be completely or substantially completely closed, wherein the hydraulic system will "lock up," so that fluid flow and pumping stops, and, hence, wheel rotation also stops. Such a "lock up" system may adapt the invented braking system to synergistically serve as a parking brake system for the vehicle.

After reviewing this Description and Drawings, one of skill in the art will understand that an actuation system may be designed to operatively couple a rotating wheel/axle of the vehicle to a pump by a clutch system, or to start-up/speed-up a pump already mechanically connected to the wheel/axle of the vehicle, depending on the type of pump chosen. Various types of liquid pumps adapted or adaptable to be powered by rotational movement are known and may be installed in embodiments of the invention.

Heat may need to be removed from the pump circuit, for example, due to energy being dissipated at the site of the restricted nozzle(s) during nozzle(s) operation. Conventional heat transfer, including cooling fins or fan-assisted heat exchange with air, may be provided.

The turbine generator continues to rotate and generate electrical power after the flow of hydraulic fluid is removed from the cup blades of the turbine. In this fashion, nearly all of the kinetic energy stored in the rotating components of the turbine generator is recovered for use by the vehicle.

This invention of a turbine generator regenerative braking system is applicable to vehicles powered by internal combustion engines, pure electrical vehicles and hybrid vehicles. In fact, the inventor believes this invention has universal applicability to any device requiring a means for braking which may be adapted for energy conservation off the rotating shaft.

These and many other features and attendant advantages of the invention will become apparent, as the invention becomes better understood by reference to the following detailed descriptions and accompanying drawings.

DETAILED DESCRIPTION OF THE INVENTION

Figure 1:
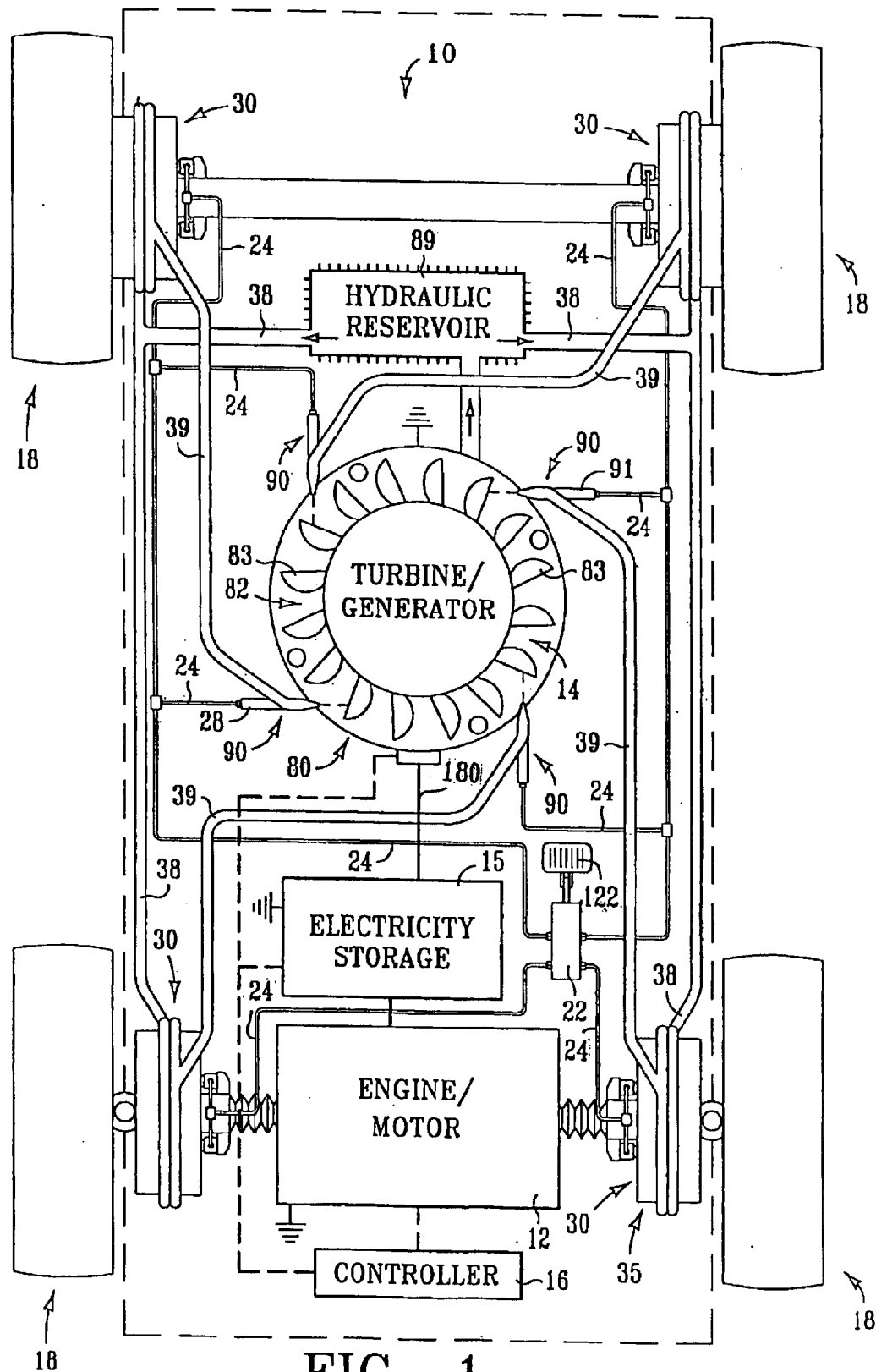
FIG. 1 is a schematic plan view of one embodiment of the invention as applied to a four-wheeled vehicle.

With reference to FIG. 1, this invention of a turbine generator regenerative braking system 10 for an automotive vehicle having ground engaging wheels 18 and electrical energy storage device 15, comprises hydraulic fluid turbine generator 80 having an electrical power output 180 connected to the electrical energy storage device 15, a plurality of hydraulic fluid pumps 30 (one each at the wheels 18), an hydraulic fluid circuit operatively and cooperatively connecting the hydraulic pumps to the turbine generator, and an actuation system(s) 35 for causing the pump to be operative engaged with the wheel or to otherwise begin pumping at an appropriate flow-rate or flow-rates to slow the wheel. As discussed in the Summary, the actuation system may comprise, for example, a clutch assembly, a positive-displacement-variation system for a positive displacement pump, or other system operatively connected between the wheels of the vehicle and the hydraulic fluid pump to engage/start-up/increase pumping when the driver/operator brakes the vehicle. In some embodiments, pumps 30 have a fixed displacement with a clutch, however, some embodiments incorporate variable displacement pumps without a clutch.

In FIG. 1, each actuation system 35 is shown as powered by a hydraulic line 24 from a hydraulic master cylinder 22 operated by the vehicle cab brake foot pedal 122. The actuation may be an on-off system, for example, wherein pressing on the pedal engages the clutch and harder pressing on the pedal then further applies the brakes by adjusting the needle valves in the nozzles for increased braking (discussed below). Or, the actuation may be an adjustable system, for example, wherein pressing on the pedal "starts up" the pump at a nominal rate or volume and further pressing on the pedal increases the rate or volume for increased braking.

Figure 2:
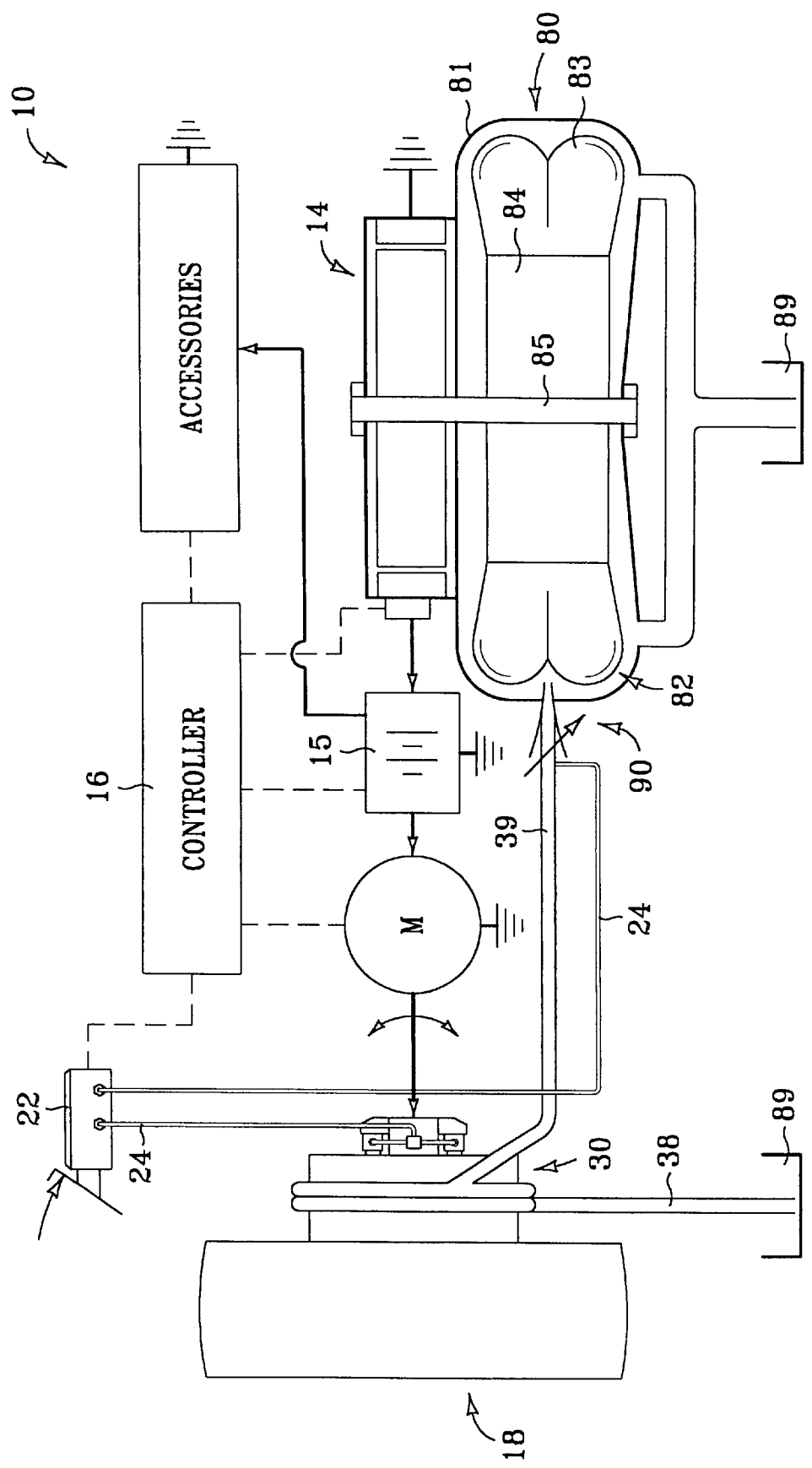
FIG. 2 is a schematic elevation view of one embodiment of the invention showing key components of the turbine generator, pumps and nozzles.

Referring now to FIGS. 1 and 2, the turbine generator further includes generator section 14, casing 81, turbine shaft 85, flywheel portion 84 and runner portion 82. The runner has a plurality of cup blades 83. FIGS. 1 and 2 also show hydraulic fluid reservoir 89, which serves as the feed reservoir for supplying the pumps 30 and receiving circulated fluid exiting the turbine, interconnecting hydraulic lines 38 from the reservoir to the pumps, and lines 39 from the pumps to the adjustable nozzles 90, from which the fluid sprays/jets against the turbine, brake master cylinder 22, adjustable nozzles 90 and interconnecting hydraulic fluid conduits 24, 38, 39.

In FIGS. 1 and 2, there are shown arrangements of hydraulic lines 24 containing hydraulic fluid from the master cylinder system that travel to and control the actuation system 35 and also the adjustable needle valves in the nozzles 90. One may see that this master-cylinder-actuator-nozzle-hydraulic-fluid system is preferably separate from the pump-nozzle-turbine hydraulic system, and is a control system for actuating and/or adjusting the clutch/pump system and for adjusting the variable valving for the nozzles. Thus, this control system serves to control the start of braking, the force of braking, and the duration of braking by controlling engagement of the pumps on the wheels and the workload applied to the pumps and the wheels.

Figure 3:
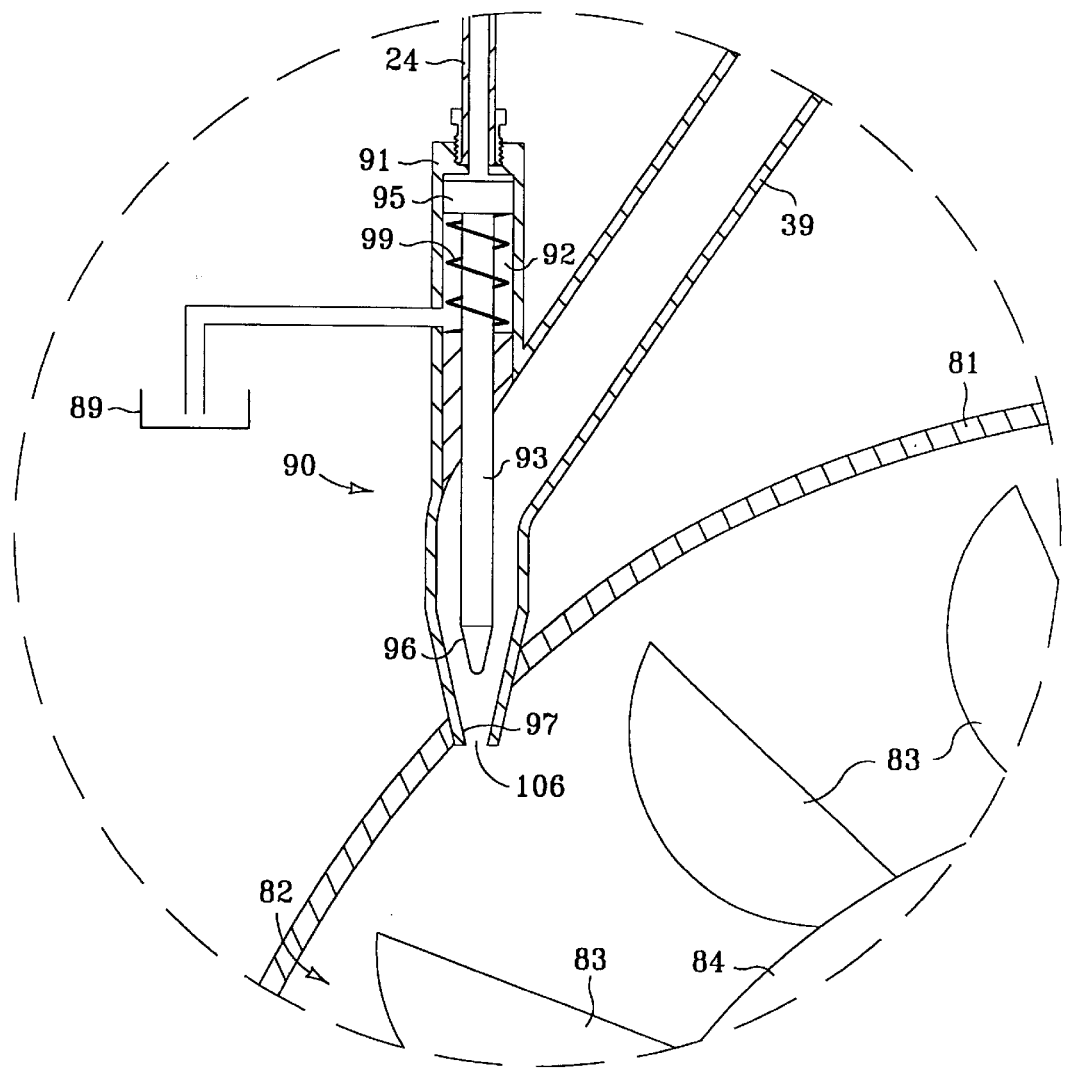
FIG. 3 is a cutaway view of one embodiment of a turbine generator and an open nozzle according to the invention.
Figure 4:
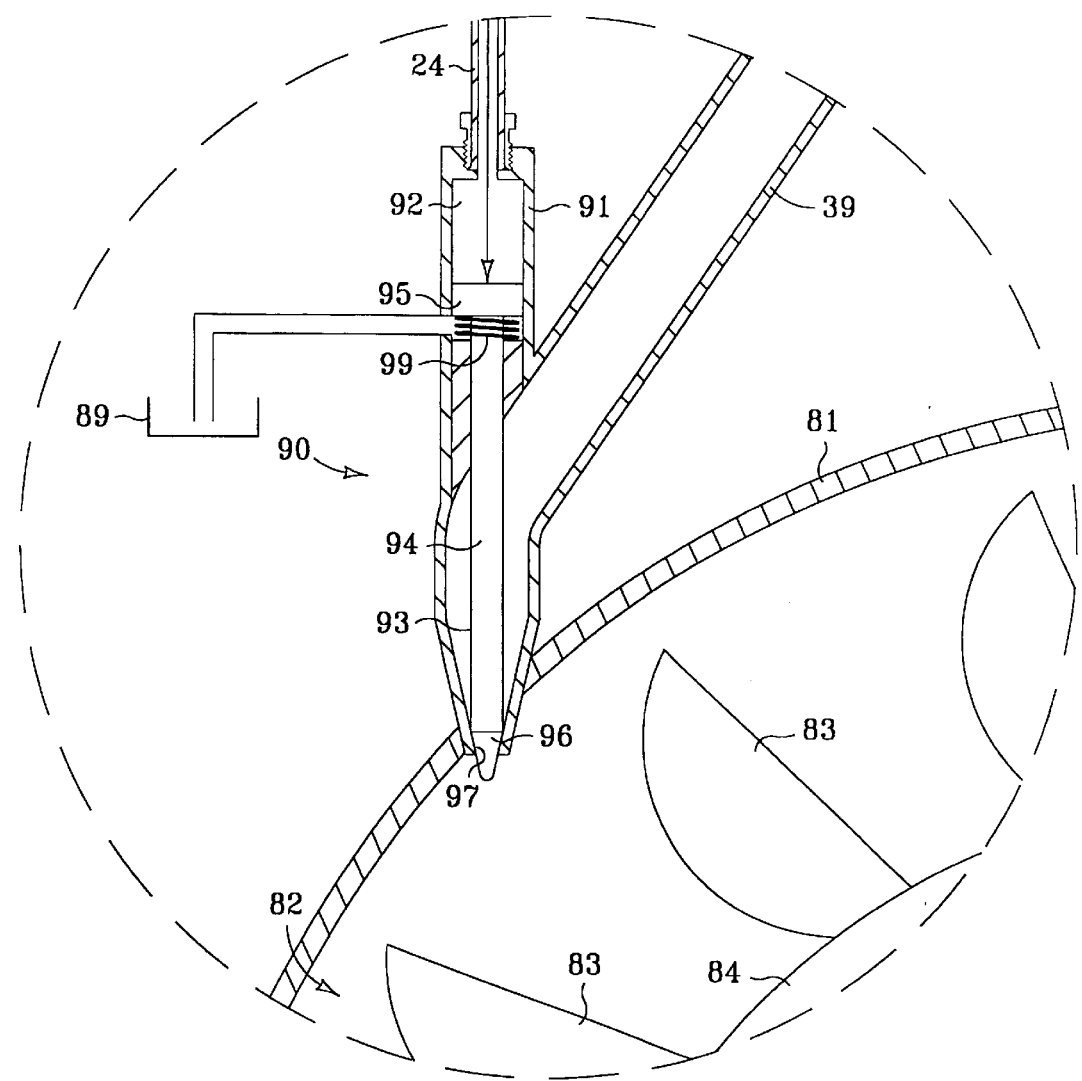
FIG. 4 is a cutaway view of the turbine generator and nozzle embodiment of FIG. 3, wherein the nozzle is closed.
Figure 5:
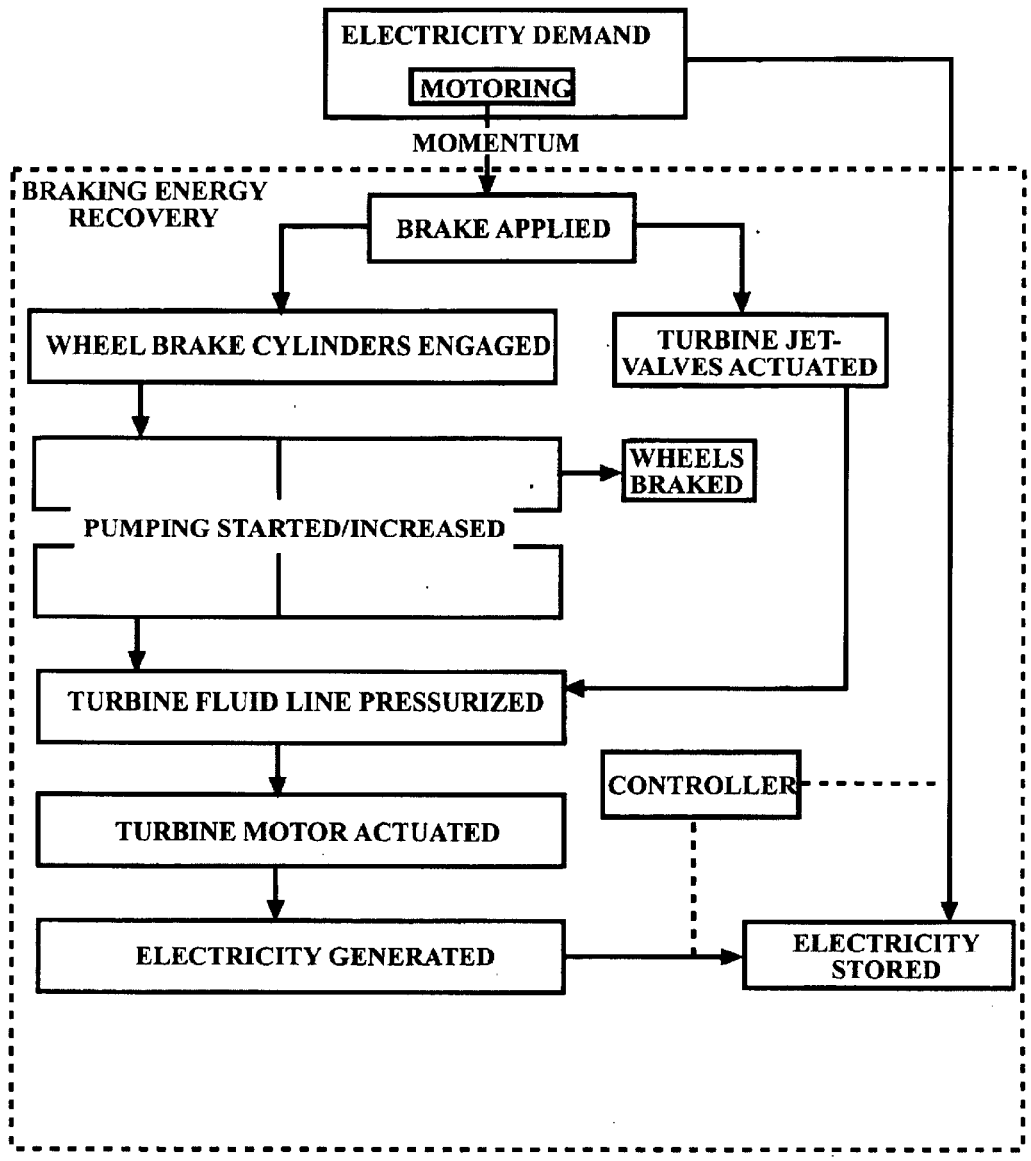
FIG. 5 is a schematic view of steps for one embodiment of the invention.

FIGS. 3 and 4 show adjustable nozzles 90 have body 91, cylinder bore 92, valve opening spring 99, and needle valve 93. The needle valve has piston end 95 and face end 96. FIG. 3 shows the needle valve in its open position and FIG. 4 shows the valve in its closed position, and therefore also suggests the variable positions and variable flowrates inbetween these two positions.

Referring now to FIGS. 1 and 2, the turbine generator further includes generator section 14, casing 81, turbine shaft 85, flywheel portion 84 and runner portion 82. The runner has a plurality of cup blades 83. FIGS. 1 and 2 also show hydraulic fluid reservoir 89, which serves as the feed reservoir for supplying the pumps 30 and receiving circulated fluid exiting the turbine, interconnecting hydraulic lines 38 from the reservoir to the pumps, and lines 39 from the pumps to the adjustable nozzles 90, from which the fluid sprays/jets against the turbine. Brake master cylinder 22, adjustable nozzles 90 and interconnecting hydraulic fluid conduits 24, 38, 39 are shown in FIGS. 1 and 2.

In operation, braking is initiated by the actuation of brake master cylinder 22 which provides hydraulic pressure to each clutch/actuator 35 and to each nozzle 90. In clutch embodiments, this causes each clutch to engage and mechanically connect each rotating wheel 18 with its corresponding hydraulic pump 30. Actuation of the master cylinder also causes needle valves 93 to adjust their position, thus allowing the pressurized fluid output of each pump to impinge on cup blades 83 of runner 82 at appropriate rates/volumes, causing turbine flywheel 84 and generator section 14 to rotate. The rotation of the turbine generator thus produces electrical power which is transmitted to the vehicle's electrical energy storage device. This extraction of power from the hydraulic circuit initiates the braking action on each of the wheels. Further braking action is achieved by reducing the fluid flow in each pump's output circuit by a closing movement of the needle valves within the nozzle bodies as controlled by the master cylinder. This action increases the pressure in the output circuit of each pump, which increases the energy required by the pump to accomplish a given amount of pumping, which translates to a reduction of the pump's speed and further slowing of the wheels, via the clutches or other linkage to the wheels.

It is a preferred and important feature of this invention that the turbine generator continues to rotate and generate electrical power after the flow of hydraulic fluid is removed from the cup blades of the turbine. In this fashion, nearly all of the kinetic energy stored in the rotating components of the turbine generator is recovered for use by the vehicle.

Although this invention has been described above with reference to particular means, materials and embodiments, it is to be understood that the invention is not limited to these disclosed particulars, but extends instead to all equivalents within the scope of the following claims.

I claim:

1. A turbine generator regenerative braking system for a vehicle having ground-engaging wheels and an electrical storage system, said braking system comprising:
   at least one positive displacement pump mechanically coupled to a ground engaging wheel, so that said wheel drives the pump and the wheel rotation is slowed by driving said pump;
   a hydraulic fluid circuit receiving liquid from said pump and having an outlet;
   a hydraulic fluid turbine having an electrical power output connected to the electrical storage system;
   wherein said fluid circuit outlet comprises a needle valve and said positive displacement pump forces hydraulic liquid through said hydraulic fluid circuit and through said needle valve to impact and rotate said turbine to generate electricity so that said electricity is stored in the electrical storage system; and
   wherein said needle valve is moveable to positions ranging from an open position to a closed position so that closing said needle valve forms a flow restriction that puts more work load on said positive displacement pump so that driving the positive displacement pump increases said slowing of the wheel.

2. A braking system as in claim 1 comprising a foot pedal that actuates said mechanical coupling of the pump to the wheel to start pumping of the hydraulic fluid.

3. A braking system as in claim 1 comprising a fly wheel connected to said turbine that continues electricity generation when pumping of hydraulic fluid stops.

4. A braking system as in claim 1 wherein said needle valve is adjustable in direction relative to the turbine to adjust the direction of impact of the hydraulic fluid on the turbine.

5. A braking system as in claim 1 comprising a foot pedal that both actuates said mechanical coupling between the pump and the wheel and moves the needle valve toward the closed position to put more work load on the pump to increase braking of the wheel.

6. A braking system as in claim 5, wherein the needle valve, when in the closed position, prevents pumping of said hydraulic liquid and thereby prevents wheel movement, so that said braking system is a parking brake.

7. A braking system as in claim 1 comprising a foot pedal that moves the needle valve toward the closed position to put more work load on the pump to increase braking of the wheel.

8. A braking system as in claim 7, wherein the needle valve, when in the closed position, prevents pumping of said hydraulic liquid and thereby prevents wheel movement, so that said braking system is a parking brake.

* * * * *